United States Patent
Liu

(10) Patent No.: US 11,178,637 B2
(45) Date of Patent: Nov. 16, 2021

(54) PAGING MESSAGE RECEIVING METHOD AND DEVICE, AND PAGING CONFIGURATION METHOD AND DEVICE

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/645,439

(22) PCT Filed: Sep. 8, 2017

(86) PCT No.: PCT/CN2017/100993
§ 371 (c)(1),
(2) Date: Mar. 6, 2020

(87) PCT Pub. No.: WO2019/047143
PCT Pub. Date: Mar. 14, 2019

(65) Prior Publication Data
US 2020/0280955 A1 Sep. 3, 2020

(51) Int. Cl.
*H04W 68/00* (2009.01)
*H04W 68/02* (2009.01)
(Continued)

(52) U.S. Cl.
CPC .......... *H04W 68/005* (2013.01); *H04B 1/713* (2013.01); *H04L 5/0092* (2013.01); *H04W 68/02* (2013.01); *H04W 76/11* (2018.02)

(58) Field of Classification Search
CPC .. H04L 5/0092; H04W 68/00; H04W 68/005; H04W 68/02; H04W 68/025; H04W 72/04; H04W 76/11
(Continued)

(56) References Cited

U.S. PATENT DOCUMENTS

2008/0081645 A1* 4/2008 Kim .................... H04W 68/025
455/458
2013/0010707 A1 1/2013 Gaal et al.
(Continued)

FOREIGN PATENT DOCUMENTS

CN 101379723 A 3/2009
CN 104380820 A 2/2015
(Continued)

OTHER PUBLICATIONS

English translation of the Written Opinion of the International Search Authority in PCT Application No. PCT/CN2017/100993, dated May 28, 2018, (3p).
(Continued)

*Primary Examiner* — Harun Chowdhury
(74) *Attorney, Agent, or Firm* — Arch & Lake LLP

(57) ABSTRACT

Provided are a paging message receiving method and device, a paging configuration method and device, a UE, a base station, and a computer-readable storage medium. The paging message receiving method includes: receiving paging configuration information from a base station, the paging configuration information including a Band Width Part (BWP) identifier of a BWP for receiving, by the UE, the paging message, and being configured on a minimum band width supported by the UE in a BWP corresponding to the BWP identifier; acquiring, according to the paging configuration information, the BWP identifier for receiving the paging message; determining a number of BWP(s)supported by the UE; and receiving, according to the number of BWP(s), the paging message on the BWP corresponding to the acquired BWP identifier, thereby avoiding the insufficiency of frequency domain resources caused by FDM of a SSB and a paging channel on a BWP.

4 Claims, 8 Drawing Sheets

(51) Int. Cl.
*H04W 76/11* (2018.01)
*H04B 1/713* (2011.01)
*H04L 5/00* (2006.01)

(58) Field of Classification Search
USPC .................. 370/252, 329, 330, 341; 455/458
See application file for complete search history.

(56) References Cited

U.S. PATENT DOCUMENTS

| | | | |
|---|---|---|---|
| 2014/0304362 A1 | 10/2014 | Phillips et al. | |
| 2015/0295762 A1 | 10/2015 | Phillips et al. | |
| 2020/0205126 A1* | 6/2020 | Wu | H04L 5/0092 |

FOREIGN PATENT DOCUMENTS

| | | |
|---|---|---|
| CN | 105247873 A | 1/2016 |
| EP | 1874070 A1 | 1/2008 |
| WO | 2012094215 A1 | 7/2012 |

OTHER PUBLICATIONS

3GPP TR 38.811V0.1.0 (Jun. 2017), 3rd Generation Partnership Project; Technical Specification Group Radio Access Network; Study on New Radio (NR) to support Non Terrestrial Networks (Release 15), (22p).

International Search Report to PCT Application No. PCT/CN2017/100993 dated May 28, 2018 with English translation, (5p).

ZTE, "Resource Allocation for Wideband Operation, R1-1712669," 3GPP TSG RAN WG1 Meeting #90, Aug. 25, 2017, (7p).

ZTE, "Resource Allocation for Wideband Operation, R1-1710126," 3GPP TSG RAN WG1 NR Ad-Hoc#2, Jun. 30, 2017, section 2.2, (xp).

Samsung, "RAN2 Considerations for Bandwidth Part in NR. R2-1708088," 3GPP TSG RAN WG2 NR#99 Meeting, Aug. 25, 2017, (5p).

Intel Corporation "Open Issues for Wider Bandwidth Operations, R1-1710583," 3GPP TSG RAN WG1 NR Ad-Hoc#2, Jun. 30, 2017, (7p).

Guangdong OPPO Mobile Telecom; "On NR paging design and transmission", 3GPP TSG RAN WG1 NR Ad-Hoc#2 R1-1710136, Jun. 16, 2017, section 2.

Guangdong OPPO Mobile Telecom; "Bandwidth part configuration and frequency resource allocation", 3GPP TSG RAN WG1 NR Ad-Hoc#2 R1-1710164, Jun. 16, 2017, entire document.

First Office Action of the Chinese application No. 201780001552.6, dated Feb. 3, 2021.

* cited by examiner

PAGING MESSAGE RECEIVING METHOD AND DEVICE, AND PAGING CONFIGURATION METHOD AND DEVICE

CROSS-REFERENCE TO RELATED APPLICATION

This application is a National Stage of International Application No. PCT/CN2017/100993, filed on Sep. 8, 2017, the contents of which are incorporated herein by reference in its entirety.

TECHNICAL FIELD

The disclosure relates to the technical field of communications, and more particularly, to a method for receiving a paging message and device, a paging configuration method and device, a User Equipment (UE), a base station, and a computer-readable storage medium.

BACKGROUND

With the rapid development of a wireless communication technology, a 5th Generation mobile communication technology (5G) system appears. The 5G system has a very wide band. In order to prevent a UE from searching for synchronization signals for too long, a high frequency may be defined as a plurality of Band Width Parts (BWPs). Each BWP may be configured with a synchronization signal or a synchronization signal set. Meanwhile, the capabilities of UEs in the 5G system are very different. Some UEs only support a minimum band width in one BWP, that is, a band narrower than one BWP, while some UEs may support a plurality of BWPs.

SUMMARY

In view of this, the disclosure provides a method and device for receiving a paging message, a paging configuration method and device, a UE, a base station, and a computer-readable storage medium, intended to prevent insufficiency of frequency domain resources caused by performing FDM of an SSB and a paging channel on a BWP.

According to a first aspect of embodiments of the disclosure, a method for receiving a paging message is provided. The method may be applied to a UE. The method may include:

receiving paging configuration information from a base station, the paging configuration information including a BWP identifier of a BWP for receiving, by the UE, a paging message, and the paging message being configured on a minimum band width supported by the UE in a BWP corresponding to the BWP identifier;

acquiring, according to the paging configuration information, the BWP identifier for receiving the paging message;

determining a number of BWP(s) supported by the UE; and receiving, according to the number of BWP(s) supported by the UE, the paging message on the BWP corresponding to the acquired BWP identifier.

In one embodiment, the step of receiving, according to the number of BWP(s) supported by the UE, the paging message on the BWP corresponding to the acquired BWP identifier may include:

in a case that the number of BWP(s) supported by the UE is one, receiving, in a frequency hopping manner, the paging message on the BWP corresponding to the acquired BWP identifier in split time.

In one embodiment, the step of receiving, according to the number of BWP(s) supported by the UE, the paging message on the BWP corresponding to the acquired BWP identifier may include:

in a case that the number of BWP(s) supported by the UE is more than one, calculating time spent in different receiving modes according to the acquired BWP identifier, and receiving the paging message on the BWP corresponding to the acquired BWP identifier by a receiving mode in which least time is spent.

According to a second aspect of the embodiments of the disclosure, a paging configuration method is provided. The method may be applied to a base station. The method may include:

generating paging configuration information, the paging configuration information including a BWP identifier of a BWP for receiving, by the UE, a paging message, and the paging message being configured on a minimum band width supported by the UE in a BWP corresponding to the BWP identifier; and sending the paging configuration information to the UE.

In one embodiment, the paging configuration information may be carried in system information.

In one embodiment, the UE may include a UE supporting one BWP and a UE supporting a plurality of BWPs.

According to a third aspect of the embodiments of the disclosure, a device for receiving a paging message is provided. The device may be applied to a UE. The device may include:

a first receiving module, configured to receive paging configuration information from a base station, the paging configuration information including a BWP identifier of a BWP for receiving, by the UE, a paging message, and the paging message being configured on a minimum band width supported by the UE in a BWP corresponding to the BWP identifier;

an acquisition module, configured to acquire, according to the paging configuration information received by the first receiving module, the BWP identifier for receiving the paging message;

a determination module, configured to determine a number of BWP(s) supported by the UE; and a second receiving module, configured to receive, according to the number of BWP(s) that is supported by the UE and determined by the determination module, the paging message on the BWP corresponding to the BWP identifier acquired by the acquisition module.

In one embodiment, the second receiving module may be configured to:

in a case that the number of BWP(s) supported by the UE is one, receive, in a frequency hopping manner, the paging message on the BWP corresponding to the acquired BWP identifier in split time.

In one embodiment, the second receiving module may be configured to:

in a case that the number of BWP(s) supported by the UE is more than one, calculate time spent in different receiving modes according to the acquired BWP identifier, and receive the paging message on the BWP corresponding to the acquired BWP identifier by a receiving mode in which least time is spent.

According to a fourth aspect of the embodiments of the disclosure, a paging configuration device is provided. The device may be applied to a base station. The device may include:

a generation module, configured to generate paging configuration information, the paging configuration information including a BWP identifier of a BWP for receiving, by the UE, a paging message, and the paging message being configured on a minimum band width supported by the UE in a BWP corresponding to the BWP identifier; and a sending module, configured to send the paging configuration information generated by the generation module to the UE.

In one embodiment, the paging configuration information may be carried in system information.

In one embodiment, the UE may include a UE supporting one BWP and a UE supporting a plurality of BWPs.

According to a fifth aspect of the embodiments of the disclosure, a UE is provided. The UE may include:

a processor; and a memory configured to store an instruction executable by the processor.

The processor may be configured to:

receive paging configuration information from a base station, the paging configuration information including a BWP identifier of a BWP for receiving, by the UE, a paging message, and the paging message being configured on a minimum band width supported by the UE in a BWP corresponding to the BWP identifier;

acquire, according to the paging configuration information, the BWP identifier for receiving the paging message;

determine a number of BWP(s) supported by the UE; and receive, according to the number of BWP(s) supported by the UE, the paging message on the BWP corresponding to the acquired BWP identifier.

According to a sixth aspect of the embodiments of the disclosure, a base station is provided. The base station may include:

a processor; and a memory configured to store an instruction executable by the processor.

The processor may be configured to:

generate paging configuration information, the paging configuration information including a BWP identifier of a BWP for receiving, by the UE, a paging message, and the paging message being configured on a minimum band width supported by the UE in a BWP corresponding to the BWP identifier; and send the paging configuration information to the UE.

According to a seventh aspect of the embodiments of the disclosure, a computer-readable storage medium is provided. A computer program may be stored thereon. The program may be executed by a processor to implement the steps of the foregoing method for receiving a paging message.

According to an eighth aspect of the embodiments of the disclosure, a computer-readable storage medium is provided. A computer program may be stored thereon. The program may be executed by a processor to implement the steps of the foregoing paging configuration method.

The technical solutions provided by the embodiments of the disclosure may include the following beneficial effects.

Since paging configuration information includes a BWP identifier of a BWP for receiving, by the UE, a paging message and the paging message is configured on a minimum band width supported by the UE in a BWP corresponding to the BWP identifier, the insufficiency of frequency domain resources caused by performing FDM of an SSB and a paging channel on a BWP can be avoided.

Since paging configuration information sent to a UE includes a BWP identifier of a BWP for receiving, by the UE, a paging message and the paging message is configured on a minimum band width supported by the UE in a BWP corresponding to the BWP identifier, the insufficiency of frequency domain resources caused by performing FDM of an SSB and a paging channel on a BWP can be avoided.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Figure 1:
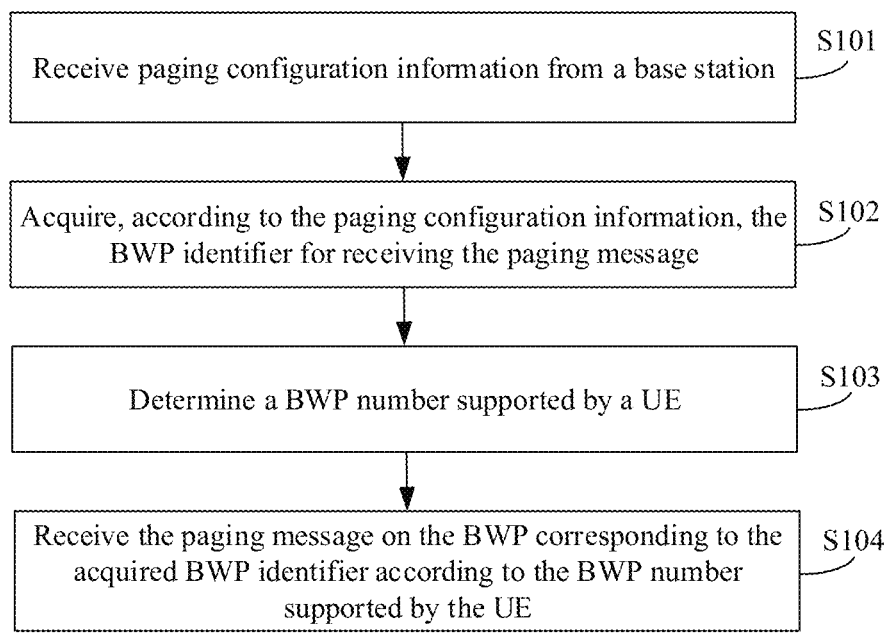
FIG. 1 is a flowchart showing a method for receiving a paging message according to an exemplary embodiment of the disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

Generally, all terms used in the claims are to be interpreted according to their ordinary meaning in the technical field, unless explicitly defined otherwise herein. All references to "a/an/the/said [element, device, component, means, step, etc.]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

Additionally, in a context of the present disclosure, a user equipment (UE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Furthermore, in the context of the present disclosure, the term "BS" may represent, e.g., a node B (NodeB or NB), an evolved NodeB (eNodeB or eNB), a radio header (RH), a remote radio head (RRH), a relay, or a low power node such as a femto, a pico, and so on.

5G systems may be applicable to high bands, that is, bands above 6 GHz. In a high band, because of the poor propagation characteristics of radio waves, traditional omnidirectional transmission may be no longer applicable, and beam scanning and beam management need to be introduced for communication, which may cause excessive paging overheads. In order to save resources, Frequency Division Multiplexing (FDM) of a Synchronization Signal Block (SSB) and a paging channel may be performed on a BWP. However, the FDM of the SSB and the paging channel on the BWP may cause frequency domain resources insufficient.

FIG. 1 is a flowchart showing a method for receiving a paging message according to an exemplary embodiment of the disclosure. This embodiment is described from the angle of a UE. As shown in FIG. 1, the method for receiving a paging message includes the following steps.

In step S101, paging configuration information sent by a base station is received, the paging configuration information including a BWP identifier of a BWP for receiving, by the UE, a paging message, and the paging message being configured on a minimum band width supported by the UE in a BWP corresponding to the BWP identifier.

In order to prevent the insufficiency of frequency domain resources, a base station may generate paging configuration information for a UE and send the paging configuration information to the UE. The paging configuration information may include a BWP identifier of a BWP for receiving, by the UE, a paging message, and the paging message may be configured on a minimum band width supported by the UE in a BWP corresponding to the BWP identifier. That is, the base station may prevent the insufficiency of frequency domain resources by configuring paging on the minimum band width supported by the UE in the BWP.

In step S102, the BWP identifier for receiving the paging message is acquired according to the paging configuration information.

In step S103, a number of BWP(s) supported by the UE is determined.

The UE may support one BWP, that is, the UE is a narrow-band UE. The UE may also support a plurality of BWPs, that is, the UE is a broad-band UE.

In step S104, the paging message is received on the BWP corresponding to the acquired BWP identifier according to the number of BWP(s) supported by the UE.

In this embodiment, in a case that the number of BWP(s) supported by the UE is one, a paging message may be received in a frequency hopping manner on a BWP corresponding to the acquired BWP identifier in split time. In a case that the number of BWP(s) supported by the UE is more than one, the time spent in different receiving modes may be calculated according to the acquired BWP identifier, and a paging message may be received on a BWP corresponding to the acquired BWP identifier by a receiving mode in which least time is spent.

Figure 2:
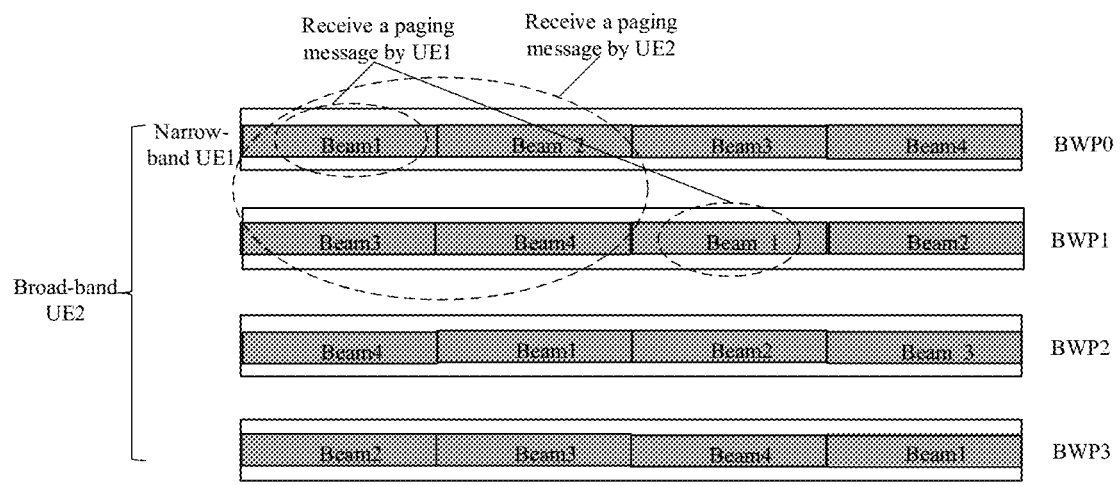
FIG. 2 is a schematic diagram showing a UE receiving a paging message according to an exemplary embodiment of the disclosure.

For example, it is assumed that a number of BWP(s) supported by UE1 is one and BWP identifiers acquired by UE1 are BWP0 and BWP1. As shown in FIG. 2, UE1 may receive paging messages in a frequency hopping manner at BWP0 and BWP1 in split time. It is assumed that a number of BWP(s) supported by UE2 is more than one and BWP identifiers acquired by UE2 are BWP0 and BWP1. After determining by calculation that parallel receiving of paging messages at BWP0 and BWP1 costs least time, UE2 may receive paging messages at BWP0 and BWP1 in a parallel manner, as shown in FIG. 2, thereby saving the time of receiving paging messages.

In the foregoing embodiment, paging configuration information sent by a base station may be received, the BWP identifier for receiving a paging message may be acquired according to the paging configuration information, and the paging message may be received on a BWP corresponding to the acquired BWP identifier according to a determined number of BWP(s) supported by the UE. Since the paging configuration information includes a BWP identifier of a BWP for receiving, by the UE, a paging message and the paging message is configured on a minimum band width supported by the UE in a BWP corresponding to the BWP identifier, the insufficiency of frequency domain resources caused by performing FDM of an SSB and a paging channel on a BWP can be prevented.

Figure 3:
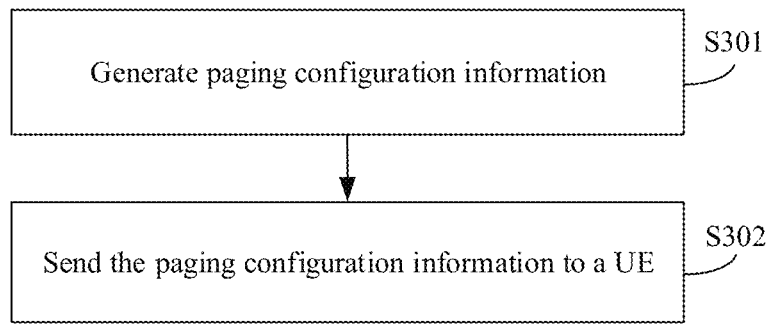
FIG. 3 is a flowchart showing a paging configuration method according to an exemplary embodiment of the disclosure.

FIG. 3 is a flowchart showing a paging configuration method according to an exemplary embodiment of the disclosure. This embodiment is described from a base station. As shown in FIG. 3, the paging configuration method includes the following steps.

In step S301, paging configuration information is generated, the paging configuration information including a BWP identifier of a BWP for receiving, by the UE, a paging message, and the paging message being configured on a minimum band width supported by the UE in a BWP corresponding to the BWP identifier.

In step S302, the paging configuration information is sent to the UE.

The paging configuration information may be carried in system information, that is, the base station may send the paging configuration information to the UE through the system information.

In this embodiment, the UE may include a UE supporting one BWP, that is, a narrow-band UE, or a UE supporting a plurality of BWPs, that is, a broad-band UE. That is, the base station may send, after generating paging configuration information, the paging configuration information to all UEs in a present cell.

In the foregoing embodiment, since paging configuration information sent to a UE includes a BWP identifier of a BWP for receiving, by the UE, a paging message and the paging message is configured on a minimum band width supported by the UE in a BWP corresponding to the BWP identifier, the insufficiency of frequency domain resources caused by performing FDM of an SSB and a paging channel on a BWP can be avoided.

Figure 4:
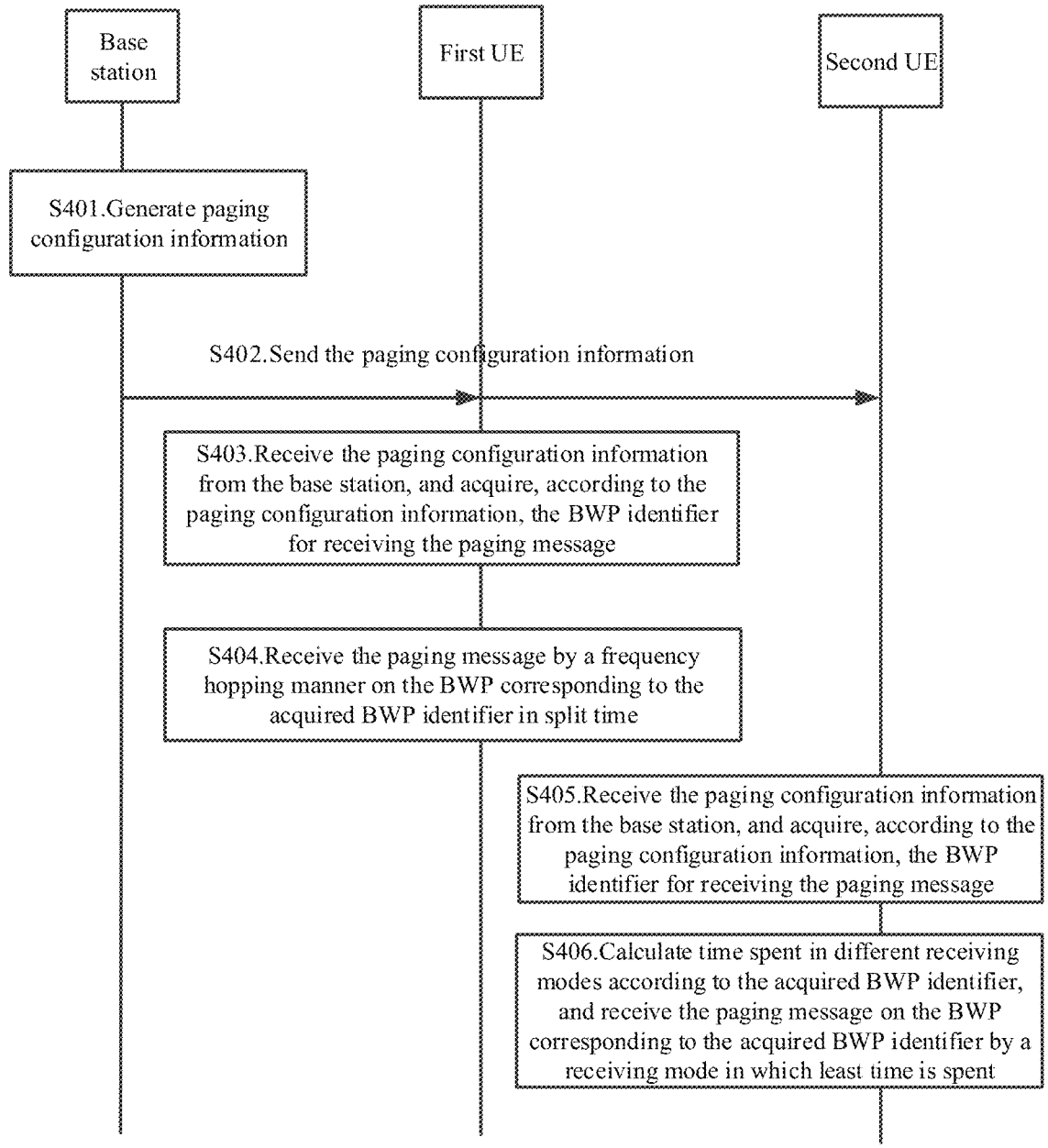
FIG. 4 is a signaling flowchart showing a method for receiving a paging message according to an exemplary embodiment of the disclosure.

FIG. 4 is a signaling flowchart showing a method for receiving a paging message according to an exemplary embodiment of the disclosure. This embodiment is described from the perspective of interaction between a base station and two UEs (it is assumed that there are only two UEs in a present cell). As shown in FIG. 4, the method for receiving a paging message includes the following steps.

In step S401, a base station generates paging configuration information, the paging configuration information including a BWP identifier of a BWP for receiving, by the UE, a paging message, and the paging message being configured on a minimum band width supported by the UE in a BWP corresponding to the BWP identifier.

In step S402, the base station sends the paging configuration information to a first UE and a second UE.

In step S403, the first UE receives the paging configuration information from the base station, and acquires the BWP identifier for receiving the paging message according to the paging configuration information.

In step S404, in response to determining that a number of BWP(s) supported by the first UE is one, the first UE receives the paging message in a frequency hopping manner on the BWP corresponding to the acquired BWP identifier in split time.

In step S405, the second UE receives the paging configuration information from the base station, and acquires the BWP identifier for receiving the paging message according to the paging configuration information.

In step S406, in response to determining that a number of BWP(s) supported by the second UE is more than one, the second UE calculates time spent in different receiving modes according to the acquired BWP identifier, and receives the paging message on the BWP corresponding to the acquired BWP identifier by a receiving mode in which least time is spent.

In the foregoing embodiment, by means of interaction between a base station and a UE, all UEs may receive paging messages according to received paging configuration information, which can avoid the insufficiency of frequency domain resources caused by performing FDM of an SSB and a paging channel on a BWP and can save the paging message receiving time of a UE supporting a plurality of BWPs.

Figure 5:
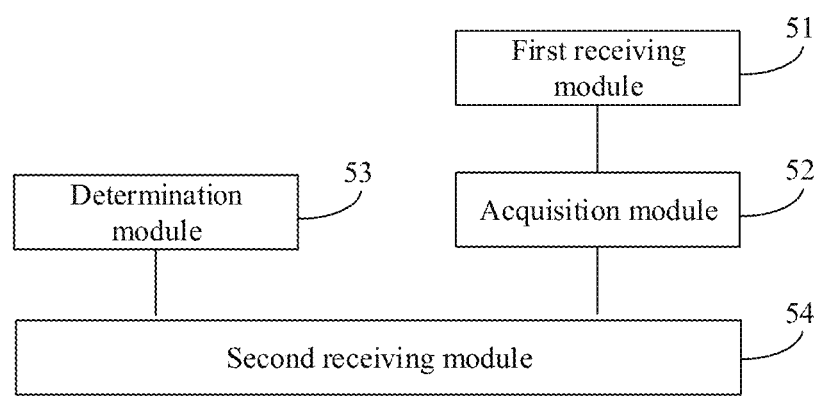
FIG. 5 is a block diagram illustrating a device for receiving a paging message according to an exemplary embodiment.

FIG. 5 is a block diagram illustrating a device for receiving a paging message according to an exemplary embodiment. The device may be located in a UE. As shown in FIG. 5, the device includes a first receiving module 51, an acquisition module 52, a determination module 53, and a second receiving module 54.

The first receiving module 51 is configured to receive paging configuration information from a base station, the paging configuration information including a BWP identifier of a BWP for receiving, by the UE, a paging message, and the paging message being configured on a minimum band width supported by the UE in a BWP corresponding to the BWP identifier.

In order to avoid the insufficiency of frequency domain resources, a base station may generate paging configuration information for a UE and send the paging configuration information to the UE. The paging configuration information may include a BWP identifier of a BWP for receiving, by the UE, a paging message, and the paging message may be configured on a minimum band width supported by the UE in a BWP corresponding to the BWP identifier. That is, the base station can avoid the insufficiency of frequency domain resources by configuring paging on the minimum band width supported by the UE in the BWP.

The acquisition module 52 is configured to acquire, according to the paging configuration information received by the first receiving module, the BWP identifier for receiving the paging message.

The determination module 53 is configured to determine a number of BWP(s) supported by the UE.

The UE may support one BWP, that is, the UE is a narrow-band UE. The UE may also support a plurality of BWPs, that is, the UE is a broad-band UE.

The second receiving module 54 is configured to receive, according to the number of BWP(s) that is supported by the UE and determined by the determination module 53, the paging message on the BWP corresponding to the BWP identifier acquired by the acquisition module 52.

The second receiving module 54 may be configured to: in a case that the number of BWP(s) supported by the UE is one, receive, in a frequency hopping manner, the paging message on the BWP corresponding to the acquired BWP identifier in split time.

In addition, the second receiving module 54 may be further configured to: in a case that the number of BWP(s) supported by the UE is more than one, calculate time spent in different receiving modes according to the acquired BWP identifier, and receive the paging message on the BWP corresponding to the acquired BWP identifier by a receiving mode in which least time is spent.

In this embodiment, in a case that the number of BWP(s) supported by the UE is one, a paging message may be received in a frequency hopping manner on a BWP corresponding to the acquired BWP identifier in split time. In a case that the number of BWP(s) supported by the UE is more than one, time spent in different receiving modes may be calculated according to the acquired BWP identifier, and a paging message may be received on a BWP corresponding to the acquired BWP identifier by a receiving mode in which least time is spent.

For example, it is assumed that a number of BWP(s) supported by UE1 is one and BWP identifiers acquired by UE1 are BWP0 and BWP1. As shown in FIG. 2, UE1 may receive paging messages at BWP0 and BWP1 in a frequency hopping manner in split time. It is assumed that a number of BWP(s) supported by UE2 is more than one and BWP identifiers acquired by UE2 are BWP0 and BWP1, then after determining by calculation that parallel receiving of paging messages at BWP0 and BWP1 costs least time, UE2 may receive paging messages at BWP0 and BWP1 in a parallel manner, as shown in FIG. 2, thereby saving the receiving time of paging messages.

In the foregoing embodiment, paging configuration information sent by a base station may be received, a BWP identifier for receiving a paging message may be acquired according to the paging configuration information, and a paging message may be received on a BWP corresponding to the acquired BWP identifier according to a determined number of BWP(s) supported by a UE. Since the paging configuration information includes a BWP identifier of a BWP for receiving, by the UE, a paging message and the paging message is configured on a minimum band width supported by the UE in a BWP corresponding to the BWP identifier, the insufficiency of frequency domain resources caused by performing FDM of an SSB and a paging channel on a BWP can be avoided.

Figure 6:
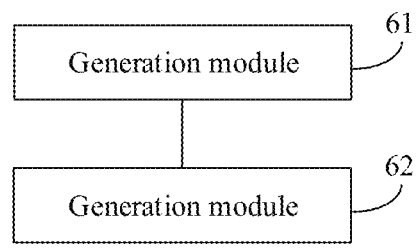
FIG. 6 is a block diagram illustrating a paging configuration device according to an exemplary embodiment.

FIG. 6 is a block diagram illustrating a paging configuration device according to an exemplary embodiment. The device may be located in a base station. As shown in FIG. 6, the device includes a generation module 61 and a sending module 62.

The generation module 61 is configured to generate paging configuration information, the paging configuration information including a BWP identifier of a BWP for receiving, by the UE, a paging message, and the paging message being configured on a minimum band width supported by the UE in a BWP corresponding to the BWP identifier.

The sending module 62 is configured to send the paging configuration information generated by the generation module 61 to the UE.

The paging configuration information may be carried in system information, that is, the base station may send the paging configuration information to the UE through the system information.

In this embodiment, the UE may include a UE supporting one BWP, that is, a narrow-band UE, or a UE supporting a plurality of BWPs, that is, a broad-band UE. That is, the base station may send, after generating paging configuration information, the paging configuration information to all UEs in a present cell.

In the foregoing embodiment, since paging configuration information sent to a UE includes a BWP identifier of a BWP for receiving, by the UE, a paging message and the paging message is configured on a minimum band width supported by the UE in a BWP corresponding to the BWP identifier, the insufficiency of frequency domain resources caused by performing FDM of an SSB and a paging channel on a BWP can be avoided.

Figure 7:
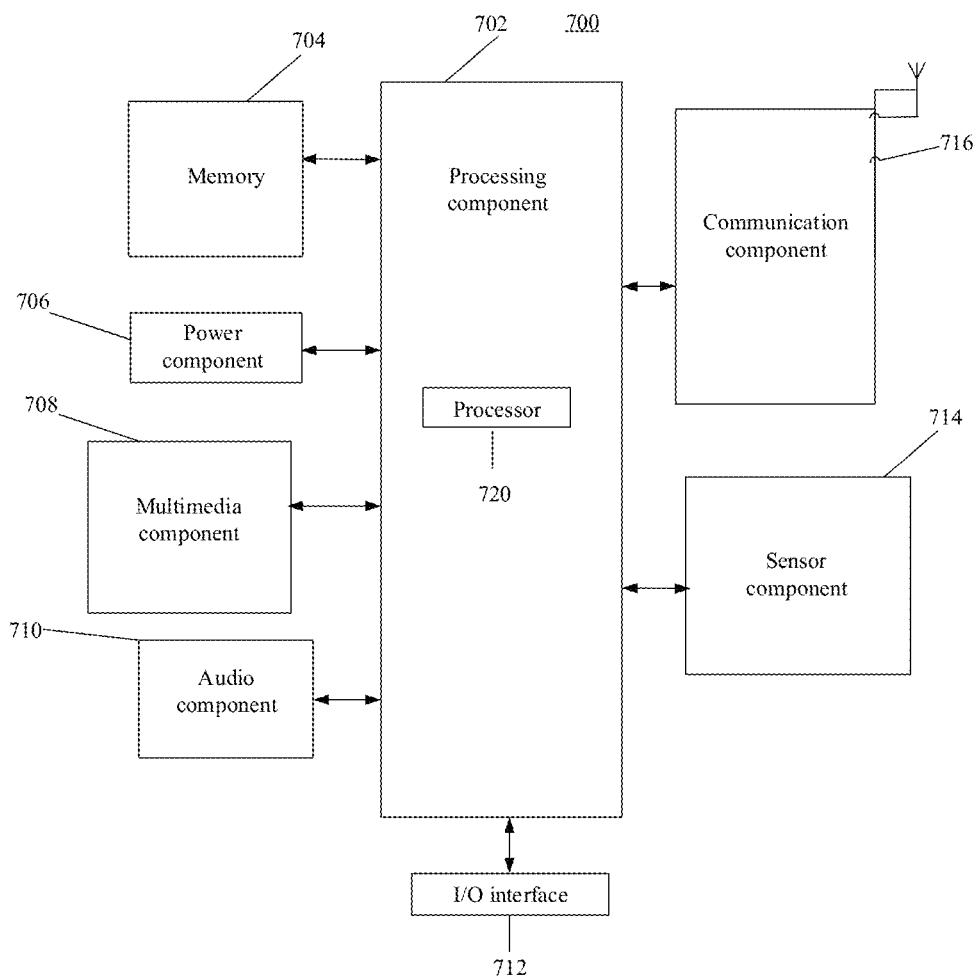
FIG. 7 is a block diagram illustrating a device applicable for receiving a paging message according to an exemplary embodiment.

FIG. 7 is a block diagram illustrating a device applicable for receiving a paging message according to an exemplary embodiment. For example, the device 700 may be a UE such as a mobile phone, a computer, a digital broadcast terminal, a messaging device, a gaming console, a tablet, a medical device, exercise equipment, and a personal digital assistant.

Referring to FIG. 7, the device 700 may include one or more of the following components: a processing component 702, a memory 704, a power component 706, a multimedia component 708, an audio component 710, an Input/Output (I/O) interface 712, a sensor component 714, and a communication component 716.

The processing component 702 is typically configured to control overall operations of the device 700, such as operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For example, the processing component 702 may include a multimedia module to facilitate the interaction between the multimedia component 708 and the processing component 702.

One of the processors 720 in the processing component 702 may be configured to:

receive paging configuration information from a base station, the paging configuration information including a BWP identifier of a BWP for receiving, by the UE, a paging message, and the paging message being configured on a minimum band width supported by the UE in a BWP corresponding to the BWP identifier;

acquire, according to the paging configuration information, the BWP identifier for receiving the paging message;

determine a number of BWP(s) supported by the UE; and receive, according to the number of BWP(s) supported by the UE, the paging message on the BWP corresponding to the acquired BWP identifier.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 706 may provide power to various components of the device 700. The power component 706 may include a power management system, one or more power sources, and any other components associated with the generation, management and distribution of power in the device 700.

The multimedia component 708 may include a screen providing an output interface between the device 700 and the user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 708 includes a front camera and/or a rear camera. The front camera and/or the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a Microphone (MIC) configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 may provide an interface between the processing component 702 and peripheral interface modules, such as a keyboard, a click wheel, or buttons. The buttons may include, but are not limited to, a home button, a volume button, a starting button, and a locking button.

The sensor component 714 may include one or more sensors to provide status assessments of various aspects of the device 700. For example, the sensor component 714 may detect an open/closed status of the device 700, and relative positioning of components. For example, the component is the display and the keypad of the device 700. The sensor component 714 may also detect a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a Complementary Metal Oxide Semiconductor (CMOS) or Charge Coupled Device (CCD) image sensor, for use in imaging applications. In some embodiments, the sensor component 714 may also include an acceleration sensor, a gyroscope sensor, a magnetic sensor, a pressure sensor, or a temperature sensor.

The communication component 716 is configured to facilitate communication, wired or wirelessly, between the device 700 and other devices. The device 700 may access a wireless network based on a communication standard, such as WiFi, 2G or 3G, or a combination thereof. In one exemplary embodiment, the communication component 716 receives a broadcast signal or broadcast associated information from an external broadcast management system via a broadcast channel. In one exemplary embodiment, the communication component 716 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In exemplary embodiments, the device 700 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

In exemplary embodiments, there is also provided a non-transitory computer-readable storage medium including instructions, such as included in the memory 704, executable by the processor 720 of the device 700 to implement the above described methods. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Figure 8:
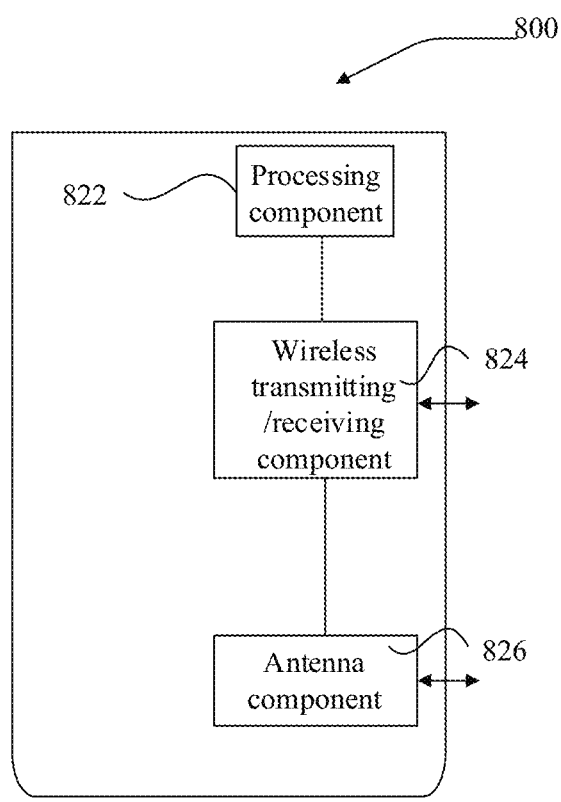
FIG. 8 is a block diagram illustrating a device applicable for paging configuration according to an exemplary embodiment.

FIG. 8 is a block diagram illustrating another device applicable for receiving a paging message according to an exemplary embodiment. A device 800 may be provided as a base station. Referring to FIG. 8, the device 800 includes a processing component 822, a wireless transmitting/receiving component 824, an antenna component 826, and a wireless interface-specific signal processing portion. The processing component 822 may further include one or more processors.

One processor in the processing component 822 may be configured to:

generate paging configuration information, the paging configuration information including a BWP identifier of a BWP for receiving, by the UE, a paging message, and the paging message being configured on a minimum band width supported by the UE in a BWP corresponding to the BWP identifier; and send the paging configuration information to the UE.

In exemplary embodiments, there is also provided a non-transitory computer-readable storage medium including instructions, executable by the processor 822 of the device 800 to complete the above described paging configuration method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

The device embodiments substantially correspond to the method embodiments, and thus related parts refer to part of descriptions of the method embodiments. The device embodiment described above is only schematic. Units described as separate parts therein may or may not be physically separated. Parts displayed as units may or may not be physical units, namely, may be located in the same place or may be distributed to a plurality of network units. Part or all of the modules therein may be selected according to a practical requirement to achieve the purpose of the solutions of the embodiments. Those of ordinary skill in the art may understand and implement without creative work.

It is to be noted that relational terms "first", "second" and the like in the disclosure are adopted only to distinguish one entity or operation from another entity or operation and not always to require or imply existence of any such practical relationship or sequence between the entities or operations. Terms "include" and "comprise" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an . . . " does not exclude existence of another element that is the same in a process, method, object or device including the element.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for receiving a paging message, applied to a User Equipment (UE), the method comprising:

receiving paging configuration information from a base station, the paging configuration information comprising a Band Width Part (BWP) identifier of a BWP for receiving a paging message by the UE, and the paging message being configured on a minimum band width supported by the UE in the BWP corresponding to the BWP identifier;

acquiring, according to the paging configuration information, the BWP identifier for receiving the paging message;

determining a number of BWP(s) supported by the UE; and receiving, according to the number of BWP(s) supported by the UE, the paging message on the BWP corresponding to the acquired BWP identifier, wherein receiving, according to the number of BWP(s) supported by the UE, the paging message on the BWP corresponding to the acquired BWP identifier comprises:
in a case that the number of BWP(s) supported by the UE is more than one, determining time spent in different receiving modes according to the acquired BWP identifier, and receiving the paging message on the BWP corresponding to the acquired BWP identifier by a receiving mode in which least time is spent.

2. The method according to claim 1, wherein receiving, according to the number of BWP(s) supported by the UE, the paging message on the BWP corresponding to the acquired BWP identifier comprises:
in a case that the number of BWP(s) supported by the UE is one, receiving the paging message on the BWP corresponding to the acquired BWP identifier by frequency hopping in a time division manner.

3. A User Equipment (UE), comprising:
one or more processors; and
a memory configured to store an instruction executable by the one or more processors,
wherein the one or more processors are configured to:
receive paging configuration information from a base station, the paging configuration information comprising a Band Width Part (BWP) identifier of a BWP for receiving a paging message by the UE, and the paging message being configured on a minimum band width supported by the UE in the BWP corresponding to the BWP identifier;
acquire, according to the paging configuration information, the BWP identifier for receiving the paging message;
determine a number of BWP(s) supported by the UE; and
receive, according to the number of BWP(s) supported by the UE, the paging message on the BWP corresponding to the acquired BWP identifier,
wherein receiving, according to the number of BWP(s) supported by the UE, the paging message on the BWP corresponding to the acquired BWP identifier comprises:
in a case that the number of BWP(s) supported by the UE is more than one, determining time spent in different receiving modes according to the acquired BWP identifier, and receiving the paging message on the BWP corresponding to the acquired BWP identifier by a receiving mode in which least time is spent.

4. The UE according to claim 3, wherein receiving, according to the number of BWP(s) supported by the UE, the paging message on the BWP corresponding to the acquired BWP identifier comprises:
in a case that the number of BWP(s) supported by the UE is one, receiving the paging message on the BWP corresponding to the acquired BWP identifier by frequency hopping in a time division manner.

* * * * *